US012641620B2

(12) United States Patent
Li

(10) Patent No.: US 12,641,620 B2
(45) Date of Patent: May 26, 2026

(54) RECEIVING METHOD AND APPARATUS, TERMINAL DEVICE, AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 311 days.

(21) Appl. No.: 18/248,423

(22) PCT Filed: Oct. 10, 2020

(86) PCT No.: PCT/CN2020/120226
§ 371 (c)(1),
(2) Date: Apr. 10, 2023

(87) PCT Pub. No.: WO2022/073239
PCT Pub. Date: Apr. 14, 2022

(65) Prior Publication Data
US 2023/0371041 A1 Nov. 16, 2023

(51) Int. Cl.
*H04W 72/044* (2023.01)
*H04W 72/0446* (2023.01)
(Continued)

(52) U.S. Cl.
CPC ..... *H04W 72/232* (2023.01); *H04W 72/0446* (2013.01); *H04W 72/0453* (2013.01);
(Continued)

(58) Field of Classification Search
CPC ... H04B 7/02–12; H04L 5/0001–0098; H04W 72/02–569; H04W 84/02–16;
(Continued)

(56) References Cited

U.S. PATENT DOCUMENTS

2019/0305909 A1* 10/2019 Chien ................... H04W 72/23
2020/0119869 A1* 4/2020 Taherzadeh Boroujeni ................
H04W 72/23
(Continued)

FOREIGN PATENT DOCUMENTS

CN 110089171 A 8/2019
EP 3544347 A1 9/2019
(Continued)

OTHER PUBLICATIONS

International Search Report and Written Opinion of International Application No. PCT/CN2020/120226, dated Jun. 21, 2021, 16 pages.
(Continued)

*Primary Examiner* — Timothy J Weidner
(74) *Attorney, Agent, or Firm* — Finnegan, Henderson, Farabow, Garrett & Dunner, L.L.P.

(57) ABSTRACT

A receiving method is performed by a terminal device and includes: determining a resource mapping relationship between control channel element (CCE) sets in N beam directions, wherein N is a positive integer greater than 1; and receiving downlink control information (DCI) signaling sent on the CCE sets in the N beam directions based on the resource mapping relationship.

15 Claims, 3 Drawing Sheets determining a resource mapping relationship between CCE sets in N beam directions 310 receiving DCI signaling sent on the CCE sets in the N beam directions based on the resource mapping relationship 320

(51) Int. Cl.

| | |
|---|---|
| *H04W 72/0453* | (2023.01) |
| *H04W 72/232* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04W 72/046* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 88/02–12; H04W 92/02–04; H04W 92/10
See application file for complete search history.

(56) References Cited

U.S. PATENT DOCUMENTS

| | | | | |
|---|---|---|---|---|
| 2020/0153581 | A1* | 5/2020 | Tsai ...................... | H04W 72/23 |
| 2020/0214027 | A1 | 7/2020 | Tang | |
| 2021/0235483 | A1* | 7/2021 | Park ...................... | H04W 72/23 |
| 2021/0345308 | A1* | 11/2021 | Liu ....................... | H04W 72/23 |

FOREIGN PATENT DOCUMENTS

| | | | |
|---|---|---|---|
| EP | | 3565295 A1 | 11/2019 |
| WO | WO 2018124027 A1 | | 7/2018 |

OTHER PUBLICATIONS

Notice of Reasons for Refusal for Japanese Patent Application No. 2023-521572, dated Jun. 12, 2024, 12 pages.

Office Action (Enquiry) for Russian Application No. 2023111844/07, issued on Oct. 25, 2023, 13 pages.

European Patent Office, Extended European Search Report issued in Application No. 20956554.8, dated Oct. 26, 2023, 12 pages.

InterDigital Inc., "On the impact of multi-beam operation on PDCCH structure", 3GPP TSG RAN WG1 Meeting #90, R1-1714148, Prague, Czech Republic, Aug. 21-25, 2017, 6 pages.

"Multi-TRP enhancements for PDCCH,PUCCH and PUSCH", Intel Corporation, 3GPP TSG RAN WG1 #102-e, R1-2005859, e-Meeting, Aug. 17-28, 2020, 12 pages.

Office Action issued by the Korean Patent Office on Jun. 30, 2025, in corresponding Application No. KR 10-2023-7015669, 19 pages.

* cited by examiner

Attorney Docket No. 13250.0157

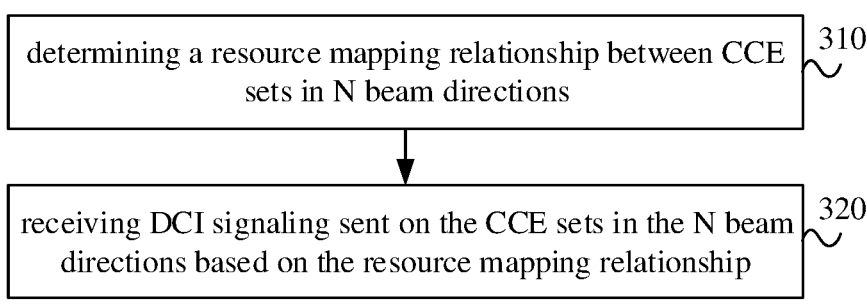

determining a resource mapping relationship between CCE sets in N beam directions    310 receiving DCI signaling sent on the CCE sets in the N beam directions based on the resource mapping relationship    320

FIG. 3

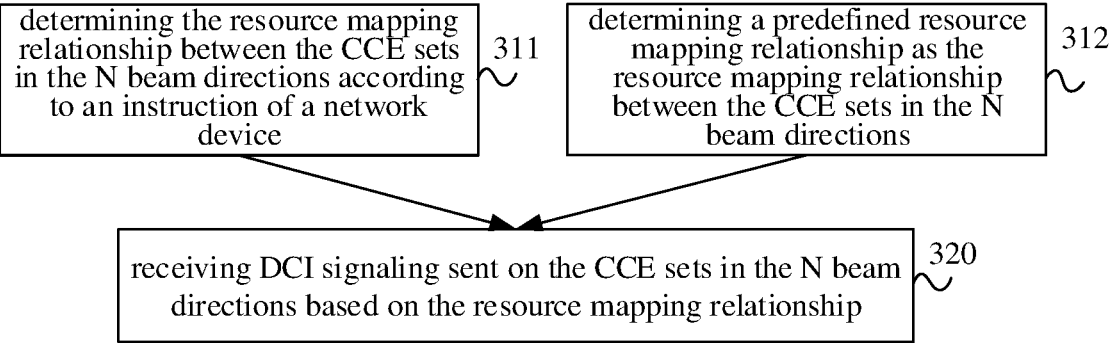

determining the resource mapping relationship between the CCE sets in the N beam directions according to an instruction of a network device    311 determining a predefined resource mapping relationship as the resource mapping relationship between the CCE sets in the N beam directions    312 receiving DCI signaling sent on the CCE sets in the N beam directions based on the resource mapping relationship    320

FIG. 4

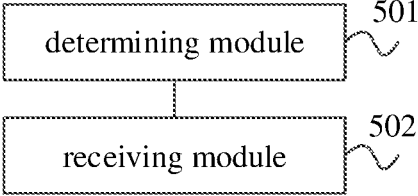

determining module    501 receiving module    502

FIG. 5

RECEIVING METHOD AND APPARATUS, TERMINAL DEVICE, AND STORAGE MEDIUM

CROSS-REFERENCE TO RELATED APPLICATION

This application is the U.S. national phase of International Application No. PCT/CN2020/120226, filed on Oct. 10, 2020, the entire content of which is incorporated herein by reference.

TECHNICAL FIELD

The disclosure relates to the field of communication technology, in particular to a receiving method, a receiving apparatus, a terminal device, and a storage medium.

BACKGROUND

In new radio (NR), especially when the communication frequency band is in the frequency range 2, due to fast attenuation of high-frequency channels, beam-based transmission and reception may be used to ensure a coverage range.

When a network device has multiple transmission reception points (TRPs), the network device can use the multiple TRPs to provide service for to the terminal device, and different TRPs correspond to different beam directions. For example, the multiple TRPs is used to send a physical downlink control channel (PDCCH) to the terminal device, the PDCCH carries downlink control information (DCI) signaling.

SUMMARY

According to an aspect of the disclosure, a receiving method is provided. The receiving method is performed by a terminal device, and includes:

determining a resource mapping relationship between control channel element (CCE) sets in N beam directions; N being a positive integer greater than 1; and receiving downlink control information (DCI) signaling sent on the CCE sets in the N beam directions based on the resource mapping relationship.

According to an aspect of the disclosure, a terminal device is provided. The terminal device includes: a processor; a transceiver connected with the processor; and a memory for storing executable instructions of the processor. The processor is configured to load and execute the executable instructions to implement the receiving method according to above aspects.

According to an aspect of the disclosure, a computer-readable storage medium is provided. The computer-readable storage medium has executable instructions stored thereon. The executable instructions are loaded and executed by a processor to implement the receiving method according to above aspects.

According to an aspect of the disclosure, a computer program product or a computer program is provided. The computer program product or the computer program includes computer instructions stored in a computer readable storage medium. A processor of a computer device reads the computer instructions from the computer readable storage medium, the processor executes the computer instructions, and causes the computer device to perform the receiving method according to above aspects.

BRIEF DESCRIPTION OF THE DRAWINGS

A brief description of drawings used in the embodiments is given below. The following descriptions are only example embodiments of the disclosure, and for those skilled in the art, other embodiments can be obtained.

FIG. 3 is a flowchart of a receiving method according to an embodiment of the disclosure.

FIG. 4 is a flowchart of a receiving method according to an embodiment of the disclosure.

FIG. 5 is a block diagram of a receiving apparatus according to an embodiment of the disclosure.

DETAILED DESCRIPTION

To make the purpose, technical solution, and advantages of the disclosure clearer, embodiments of the disclosure will be further described in detail with reference to the accompanying drawings.

Figure 1:
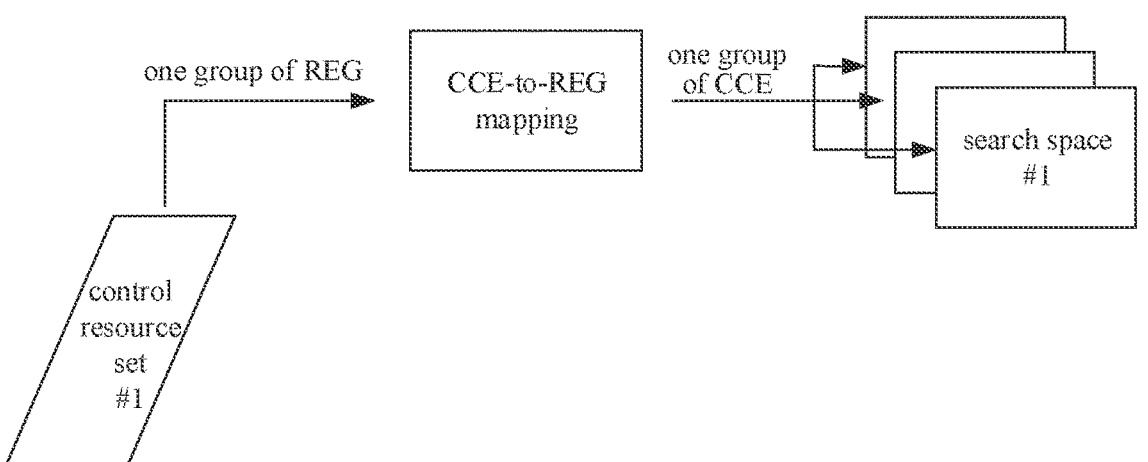
FIG. 1 is a schematic diagram of physical downlink control channel (PDCCH) processing according to an embodiment.

FIG. 1 shows a schematic diagram of physical downlink control channel (PDCCH) processing according to an embodiment.

A control resource set (CORESET) is a time-frequency resource used by a terminal device to decode possible PDCCHs using one or more search spaces. The control resource set maps a set of resource element groups (REGs) to a set of control channel elements (CCEs) through a CCE-to-REG mapping. Each REG includes a resource block on an orthogonal frequency division multiplexing (OFDM) symbol.

A CCE is a unit of the search space when a terminal performs blind detection. A set of CCEs corresponds to one or more search spaces.

A PDCCH candidate is a PDCCH candidate position that occupies several CCEs in the search space. The terminal device decodes the PDCCH candidate to receive the PDCCH by performing blind detection in the search spaces.

An aggregation level (AL) is an attribute of the search space. The aggregation level is the number of CCEs that compose a PDCCH. The protocol standard defines multiple aggregation levels, such as 1, 2, 4, 8, 16, and so on. That is, a PDCCH can be formed by an aggregation of a number of continuous CCEs, such as 1, 2, 4, 8, 16 continuous CCEs.

In the embodiment, the terminal device may decode possible PDCCHs in the search space, i.e., perform blind detection on PDCCHs. In a case of multiple transmission reception points (TRPs) sending one downlink control information (DCI) signaling, if the terminal device has no restriction on the control resource set and search space resources of the multiple TRPs, the number of CCEs that the terminal device is to detect may exceed the number of CCEs that the terminal device can support, and the number of blind detections that the terminal device performs for the PDCCH may exceed a maximum number of blind detections.

Figure 2:
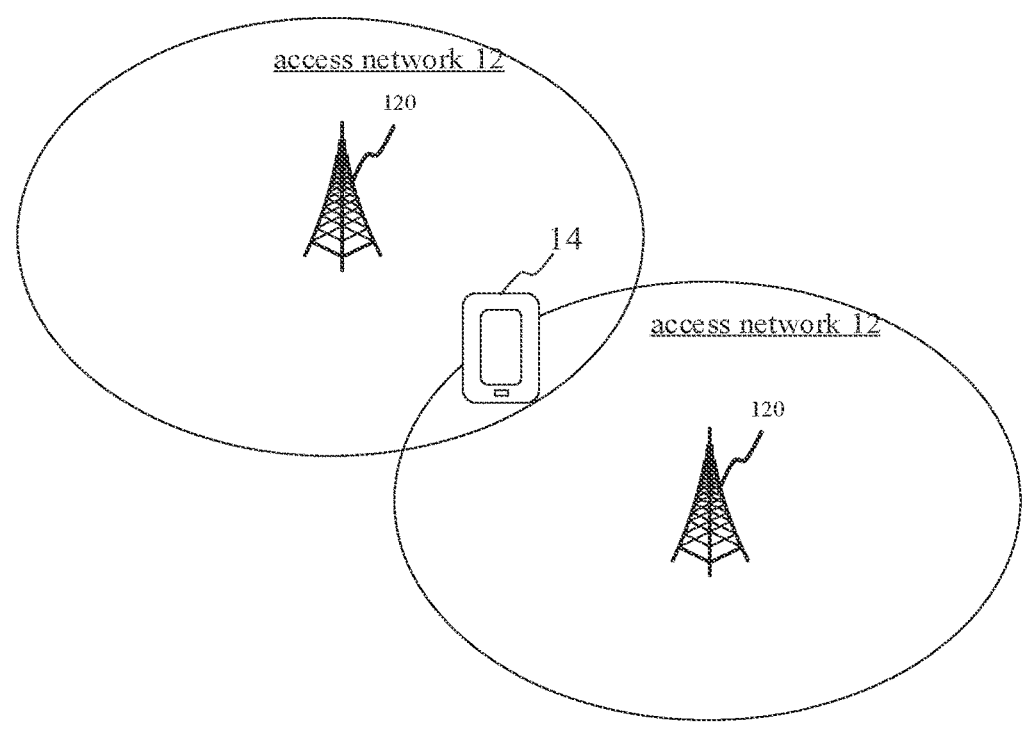
FIG. 2 is a block diagram of a communication system according to an embodiment of the disclosure.

FIG. 2 shows a block diagram of a communication system according to an embodiment of the disclosure. The communication system may include an access network 12 and a terminal device 14.

The access network 12 includes several network devices 120. The network device 120 can be a base station, which is a device deployed the access network to provide wireless communication functions for terminal devices. The base stations may include various forms of macro base stations, micro base stations, relay stations, access points, and so on, in systems using different wireless access technologies, names of devices having base-station functions may vary. For example, it may be called as an eNodeB or an eNB in a long term evolution (LTE) system, and it is called a gNodeB or a gNB in a 5G new radio (NR) system. As the communication technology evolves, the description of "base station" may change. To facilitate the description in the embodiments of the disclosure, the devices that provide wireless communication functions for the terminal device 14 are collectively referred to as network devices.

The terminal device 14 may include various handheld devices, vehicle-mounted devices, wearable devices, computing devices with wireless communication functions, or Internet of Things (IoT) devices, or industrial internet of things (IIoT) devices, or other processing devices connected to wireless modems, as well as various forms of user devices, mobile stations (MS), terminal devices, etc. For convenience of description, the devices mentioned above are collectively referred to as terminal devices. The network device 120 and the terminal device 14 communicate with each other through some kind of air interface technology, such as a Uu interface.

The technical solution of the embodiment of the disclosure can be used in various communication systems, such as, a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an NR system evolution system, an LTE-based access to unlicensed spectrum (LTE-U) system, an NR-U system, a universal mobile telecommunication system (UMTS), a worldwide interoperability for microwave access (WiMAX) communication system, a wireless local area networks (WLAN), Wireless Fidelity (WiFi), a next-generation communication system, or other communication systems.

Generally speaking, traditional communication systems support a limited number of connections and are easy to implement. However, with the development of communication technology, mobile communication systems not only support traditional communication, but also support, for example, device to device (D2D) communication, machine to machine (M2M) communication, machine type communication (MTC), Vehicle to Vehicle (V2V) communication and Vehicle to Everything (V2X) system. The embodiments of the disclosure can also be used in these communication systems.

FIG. 3 shows a flowchart of a receiving method according to an embodiment of the disclosure, which can be performed by the terminal device as shown in FIG. 2. The method includes:

Step 310, a resource mapping relationship between CCE sets in N beam directions.

N is a positive integer greater than 1.

A terminal device and A network device use beam-based transmission and reception, and there are N different beam directions. There is a resource mapping relationship between the CCE sets in the N beam directions. A CCE set is a set that contains a group of CCEs. The number of CCEs in the CCE set is not limited in the embodiments of the disclosure.

Optionally, the resource mapping relationship includes at least one of a frequency domain mapping relationship and a time domain mapping relationship. The terminal device determines the frequency domain mapping relationship and/or the time domain mapping relationship between the CCE sets in the N beam directions.

In some embodiments of the disclosure, the N beam directions may correspond to N different TRPs one by one, or one of the beam directions may correspond to two or more TRPs, or two or more of the beam directions may correspond to one TRP. Optionally, multiple TRPs may belong to a serving cell or an adjacent cell of the terminal device. The following is an exemplary illustration of N beam directions corresponding to N different TRPs one by one.

Step 320, DCI signaling sent on the CCE sets in the N beam directions is received based on the resource mapping relationship.

The DCI signaling is payload carried on the CCE sets in the N beam directions.

When the network device sends the DCI signaling through the N beam directions, the terminal device determines the resource mapping relationship between the CCE sets in the N beam directions, and receives the DCI signaling based on the resource mapping relationship.

In summary, with the method provided in this embodiment, when the network device sends the DCI signaling through the N beam directions (which may correspond to multiple TRPs), the terminal device may determine the resource mapping relationship between the CCE sets in the N beam directions and receive the DCI signaling based on the resource mapping relationship. Due to that there is the resource mapping relationship, the number of PDCCH blind detections for the terminal device can be reduced.

In an optional embodiment based on FIG. 3, FIG. 4 shows a flowchart of a receiving method according to an embodiment of the disclosure, which can be performed by the terminal device shown in FIG. 2. In this embodiment, step 310 is replaced and implemented by step 311 or step 312.

Step 311, the resource mapping relationship between CCE sets in the N beam directions is determined according to an instruction of a network device.

The resource mapping relationship is indicated by the network device to the terminal device. The terminal device determines the resource mapping relationship between the CCE sets in the N beam directions according to the instruction of the network device.

Step 312, a predefined resource mapping relationship is determined as the resource mapping relationship between the CCE sets in the N beam directions.

The resource mapping relationship is predefined, written in a standard protocol, and stored in a chip of the terminal device. The resource mapping relationship can also be understood as a default mapping relationship. The terminal device determines the resource mapping relationship between the CCE sets in the N beam directions based on the stored default mapping relationship.

Step 320, DCI signaling sent on the CCE sets in the N beam directions is received based on the resource mapping relationship.

The CCE sets in the N beam directions includes the i-th CCE set in the i-th beam direction. A value of i is from 1 to N, and N is a positive integer greater than 1.

Optionally, the CCE sets in the N beam directions separately send a complete content of the DCI signaling, that is, the i-th CCE set sends the complete content of the DCI signaling. Or, the CCE sets in the N beam directions collectively send the complete content of the DCI signaling, that is, the i-th CCE set sends a partial content of the DCI signaling, and the contents sent by the N CCE sets together constitute the complete content of the DCI signaling.

Optionally, each CCE set includes a PDCCH candidate. The PDCCH candidate is a candidate position of a PDCCH occupying several CCEs.

Optionally, the CCE sets in different beam directions belong to the same search space. Or, the CCE sets in different beam directions belong to different search spaces in the same control resource set. Or, the CCE sets in different beam directions belong to different control resource sets.

For example, with reference to FIG. 1, the control resource set #1 includes three different search spaces: search space #1, search space #2, and search space #3. The CCE sets in different beam directions can all belong to the search space #1 (i.e., the same search space). Or, the CCE sets in different beam directions can belong to search space #1, search space #2, and search space #3, respectively (i.e., different search spaces). Or, some of the CCE sets in different beam directions may belong to the control resource set #1, while others may belong to the control resource set #2 not shown (i.e., different control resource sets).

Optionally, a CCE set includes X CCEs, where X is a positive integer. X is equal to an aggregation level of the DCI signaling. Or, X is equal to the aggregation level of the DCI signaling divided by N.

The aggregation level is an attribute of the search space. The aggregation level is the number of CCEs constituting a PDCCH, PDCCH is used to send the DCI signaling. The aggregation level includes, but is not limited to, 1, 2, 4, 8, or 16.

For example, the aggregation level of the DCI signaling is 4, and the number N of the beam directions is 2, then the number X of CCEs included in the CCE set is 4 or 2.

For example, the aggregation level of the DCI signaling is 8, and the number N of the beam directions is 2, then the number X of CCEs included in the CCE set is 8 or 4.

The embodiments of the disclosure only gives illustration in that the CCE sets in the N beam directions includes the same number X of CCEs. The CCE sets in the N beam directions can also include different numbers of CCEs. The embodiment of the disclosure does not limit on this.

In conclusion, with the method provided in this embodiment, the terminal device can determine the resource mapping relationship between the CCE sets in the N beam directions and receive the DCI signaling based on the resource mapping relationship when the network device sends one DCI signaling through the N beam directions (which may correspond to multiple TRPs). Due to that there is the resource mapping relationship, the number of PDCCH blind detections of the terminal device can be reduced.

With the method provided by this embodiment, the terminal device can determine the resource mapping relationship based on the instruction from the network device, or can determine the resource mapping relationship based on a predefined content in the standard protocol, improving the flexibility of the terminal device in determining the resource mapping relationship.

In an alternative embodiment based on FIG. 3, the resource mapping relationship includes at least one of a frequency domain mapping relationship and a time domain mapping relationship.

When the resource mapping relationship includes the frequency domain mapping relationship, the N beam directions may correspond to the same frequency domain resource or may correspond to different frequency domain resources. When the resource mapping relationship includes the time domain mapping relationship, the N beam directions may correspond to the same time domain resource or may correspond to different time domain resources.

In the following, an exemplary description will be given with reference to the following embodiments.

First, the resource mapping relationship includes the frequency domain mapping relationship.

1) The N beam directions correspond to the same frequency domain resource, and the N beam directions correspond to first CCE sets in the same frequency domain.

The terminal device can receive the DCI signaling through any of the following implementation methods.

Implementation method 1: When the N beam directions separately send the complete content of the DCI signaling through the same frequency domain resource, the terminal device receives the same DCI signaling sent on the first CCE sets in the N beam directions separately.

When the N beam directions use the same frequency domain resource to send a complete DCI signaling separately, the CCE sets in the N beam directions are located at the same position in the frequency domain, and can be recorded as the first CCE sets. It can be understood that, for different beam directions, the first CCE sets have the same frequency domain position, and have the same or different time domain positions.

Implementation method 2: When the N beam directions collectively send the complete content of the DCI signaling through the same frequency domain resource, the terminal device receives the DCI signaling based on first indication information. The first indication information is configured to indicate a position order, in the DCI signaling, of a content sent on CCEs in a first CCE set corresponding to each beam direction.

When the N beam directions use the same frequency domain resource to send a portion of the DCI signaling separately, so as to collectively send the complete content of the DCI signaling, positions of the contents send by CCEs in different beam directions at the DCI signaling may be indicated.

For example, there are two TRPs, TRP #0 and TRP #1, corresponding to two different beam directions. The first CCE set includes two CCEs: CCE #0 and CCE #1. The CCEs in the first CCE set corresponding to each beam direction can be recorded as: TRP #0 CCE #0, TRP #0 CCE #1, TRP #1 CCE #0, and TRP #1 CCE #1. The same CCE corresponds to different TRPs, which actually refers to that different beam directions are used to receive information sent on the same CCE by different TRPs. The network device may indicate an order of the contents of the DCI signaling sent on these four CCEs to the terminal device, so that the terminal device can correctly decode the DCI signaling. The position order of these four CCEs in the DCI signaling may be as follows:

Order 1: TRP #0 CCE #0, TRP #0 CCE #1, TRP #1 CCE #0, TRP #1 CCE #1,

Order 2: TRP #0 CCE #0, TRP #1 CCE #0, TRP #0 CCE #1, TRP #1 CCE #1.

There may also be other orders for the four CCEs, which are not limited in the embodiments of the disclosure.

2) The N beam directions correspond to different frequency domain resources, and the N beam directions correspond to N CCE sets one by one.

The terminal device can receive the DCI signaling through any of the following implementation methods.

Implementation method 1: When the N beam directions separately send the complete content of the DCI signaling through different frequency domain resources, the terminal device receives, based on second indication information, the same DCI signaling sent on the N CCE sets in the N beam directions separately. The second indication information is configured to indicate a mapping relationship between serial numbers of specific CCEs in the N CCE sets.

When the N beam directions separately use different frequency domain resources to send one complete DCI signaling, the terminal device may determine a frequency domain position relationship between the CCEs in the N CCE sets. The frequency domain position relationship between the CCEs in the N CCE sets can be indicated by the mapping relationship between the serial numbers of the specific CCEs in the N CCE sets.

A specific CCE is a specified CCE in a CCE set. Optionally, the specific CCE is a CCE at a minimum frequency in the CCE set. Optionally, the mapping relationship between the serial numbers of the specific CCEs is configured based on different aggregation levels. Or, the mapping relationship between the serial numbers of the specific CCEs is the same for all aggregation levels.

For example, there are two TRPs: TRP #0 and TRP #1. The two TRPs correspond to two different beam directions. TRP #0 corresponds to CCE set 1, and TRP #1 corresponds to CCE set 2. CCE set 1 contains {CCE i, CCE #i+1}, and CCE set 2 contains {CCE #j, CCE #j+1}.

When the terminal device monitors on TRP #0 that CCE #i and CCE #i+1 send DCI signaling to it, it is known based on the mapping relationship that the DCI signaling sent by TRP #1 on CCE #j and CCE #j+1 is the same DCI signaling. The relationship between CCE #i and CCE #j can be as follows: j=i+offset. The offset can be 0, which means that the serial numbers are the same. The offset can also be greater than 0. When i+offset is greater than a maximum serial number of CCEs in TRP #1, a value of j is taken as (i+offset) mod (a maximum serial number of CCEs in TRP #1 plus 1).

It can be understood that the same serial number of CCEs does not mean that the frequency domain resources are the same, because frequency domain resource positions of control resource sets of TRP #0 and TRP #1 may be different, and the serial numbers of CCEs are serial number within their respective control resource sets.

Implementation method 2: When the N beam directions separately send the complete content of the DCI signaling through different frequency domain resources, the terminal device receives, based on third indication information, the same DCI signaling sent on the N CCE sets in the N beam directions separately. The third indication information is configured to indicate a mapping relationship between serial numbers of PDCCH candidates corresponding to the N CCE sets respectively.

When the N beam directions separately use different frequency domain resources to send one complete DCI signaling, the terminal device may determine a frequency domain position relationship between the CCEs in the N CCE sets. The frequency domain position relationship between the CCEs in the N CCE sets can be indicated by the mapping relationship between the serial numbers of the PDCCH candidates corresponding to the N CCE sots respectively.

Optionally, the mapping relationship between the serial numbers of the PDCCH candidates is configured based on different aggregation levels. Or, the mapping relationship between the serial numbers of the PDCCH candidates is the same for all aggregation levels.

For example, when different control resource sets are used for the N beam directions, for each aggregation level, in different control resource sets, the serial numbers of CCEs included in PDCCH candidates with same serial numbers may be the same or different. For example, an aggregation level is 4, in CORESET #0, PDCCH candidate #0 occupies CCE #0-3, PDCCH candidate #1 occupies CCE #8-11, and PDCCH candidate #2 occupies CCE #16-19. In CORESET #1, PDCCH candidate #0 occupies CCE #16-19, PDCCH candidate #1 occupies CCE #24-27, and PDCCH candidate #3 occupies CCE #0-3. The third indication information may indicate that PDCCH candidate #i in CORESET #0 corresponds to PDCCH candidate #i+offset in CORESET #1, and the offset is an integer greater than or equal to 0. When the terminal device monitors on CORESET #0 that the PDCCH candidate #0 sends DCI signaling to it, it is known based on the mapping relationship that the DCI signaling sent by the PDCCH candidate #i+offset on CORESET #1 is the same DCI signaling.

Implementation method 3: When the N beam directions collectively send the complete content of the DCI signaling through different frequency domain resources, the terminal device receives the DCI signaling based on fourth indication information. The fourth indication information is configured to indicate a mapping relationship between serial numbers of specific CCEs in the N CCE sets.

When the N beam directions use different frequency domain resources to separately send a portion of the DCI signaling, so as to collectively send the complete content of the DCI signaling, the terminal device may determine a frequency domain position relationship between CCEs in the N CCE sets. The frequency domain position relationship between the CCEs in the N CCE sets can be indicated by the mapping relationship between the serial numbers of the specific CCEs in the N CCE sets. At the same time, the terminal device can determine a position order of the contents sent by CCEs in different beam directions in DCI signaling based on a default order. The default order can be: if a transmission configuration indication (TCI) number is ranked first, a CCE content corresponding to the TCI number is ranked first.

A specific CCE is a specified CCE in a CCE set. Optionally, the specific CCE is a CCE at the lowest frequency in the CCE set. Optionally, the mapping relationship between the specific CCEs is configured based on different aggregation levels. Or, the mapping relationship between the serial numbers of the specific CCEs is the same for all aggregation levels.

Implementation method 4: When the N beam directions collectively send the complete content of the DCI signaling through different frequency domain resources, the terminal device receives the DCI signaling based on fifth indication information. The fifth indication information is configured to indicate a mapping relationship between serial numbers of specific CCEs in the N CCE sets and a position order of contents sent on the CCEs in N CCE sets in the DCI signaling.

When the N beam directions use different frequency domain resources to separately send a portion of the DCI signaling, so as to collectively send the complete content of a DCI signaling, the terminal device may determine a frequency domain position relationship between CCEs in the N CCE sets. The frequency domain position relationship between the CCEs in the N CCE sets can be indicated by the mapping relationship between the serial numbers of specific CCEs in the N CCE sets. At the same time, the terminal device can determine a position order of the contents sent by CCEs in different beam directions in the DCI signaling through the fifth indication information.

A specific CCE is a specified CCE in a CCE set. Optionally, the specific CCE is a CCE at the lowest frequency in the CCE set. Optionally, the mapping relationship between the serial numbers of the specific CCEs is configured based on different aggregation levels. Or, the mapping relationship between the serial numbers of the specific CCEs is the same for all aggregation levels.

Implementation method 5: When the N beam directions collectively send the complete content of the DCI signaling through different frequency domain resources, the terminal device receives the DCI signaling based on sixth indication information. The sixth indication information is configured to indicate a mapping relationship between serial numbers of PDCCH candidates corresponding to the N CCE sets respectively.

When the N beam directions use different frequency domain resources to separately send a portion of the DCI signaling, so as to collectively send the complete content of the DCI signaling, the terminal device may determine a frequency domain position relationship between the CCEs in the N CCE sets. The frequency domain position relationship between the CCEs in the N CCE sets can be indicated by the mapping relationship between the serial numbers of the PDCCH candidates corresponding to the N CCE sets respectively. At the same time, the terminal device can determine the position order of the contents sent on the CCEs in different beam directions in the DCI signaling based on a default order. The default order can be: a CCE content ranked first corresponds to a TCI number ranked first.

Optionally, the mapping relationship between the serial numbers of the PDCCH candidates is configured based on different aggregation levels. Or, the mapping relationship between the serial numbers of the PDCCH candidates is the same for all aggregation levels.

Implementation method 6: When the N beam directions collectively send the complete content of the DCI signaling through different frequency domain resources, the terminal device receives the DCI signaling based on seventh indication information. The seventh indication information is configured to indicate the mapping relationship between the serial numbers of the PDCCH candidates corresponding to the N CCE sets respectively and the position order of the contents sent on the CCEs in the N CCE sets in the DCI signaling.

When the N beam directions use different frequency domain resources to separately send a portion of the DCI signaling, so as to collectively send the complete content of the DCI signaling, the terminal device may determine the frequency domain position relationship between the CCEs in the N CCE sets. The frequency domain position relationship between the CCEs in the N CCE sets can be indicated by the mapping relationship between the serial numbers of PDCCH candidates corresponding to the N CCE sets respectively. At the same time, the terminal device can determine the position order of the contents send on the CCEs in different beam directions in the DCI signaling based on the seventh indication information.

Optionally, the mapping relationship between the serial numbers of the PDCCH candidates is configured based on different aggregation levels. Or, the mapping relationship between the serial numbers of the PDCCH candidates is the same for all aggregation levels.

Optionally, at least one of the second indication information, the third indication information, the fourth indication information, the fifth indication information, the sixth indication information, and the seventh indication information in the above implementation methods may be configured to indicate an ID of a search space to which the N CCE sets belong, and/or an ID of a control resource set to which the N CCE sets belong.

The ID of the search space is configured to identify different search spaces, and the ID of the control resource set is configured to identify different control resource sets. In a case where CCE sets in different beam directions belong to different search spaces of the same control resource set or belong to different control resource sets, the terminal device can determine, according to an indication, the different search spaces of the same control resource set to which the N CCE sets belong, and/or determine the different control resource sets to which the N CCE sets belong.

Second, the resource mapping relationship includes a time domain mapping relationship.

1) The N beam directions correspond to the same time domain resources, and the N beam directions correspond to second CCE sets in the same time domain.

The terminal device can receive the DCI signaling through any of the following implementation methods.

Implementation method 1. When the N beam directions separately send the complete content of the DCI signaling through the same time domain resource, the terminal device receives the same DCI signaling sent on the second CCE sets in the N beam directions.

When the N beam directions use the same time domain resource to send a complete DCI signaling, the CCE sets in the N beam directions are located at the same position in the time domain and can be recorded as the second CCE sets. It can be understood that, for different beam directions, the second. CCE sets have the same time domain position, and have the same or different frequency domain positions.

Implementation method 2: When the N beam directions collectively send the complete content of the DCI signaling through the same time domain resource, the terminal device receives the DCI signaling based on eighth indication information. The eighth indication information is configured to indicate a position order, in the DCI signaling, of the content sent on CCEs in a second CCE set corresponding to each beam direction in the DCI signaling.

When the N beam directions use the same time domain resource to separately send a portion of the DCI signaling, so as to collectively send the complete content of the DCI signaling, positions of the contents send by CCEs in different beam directions at the DCI signaling may be indicated.

For example, there are two TRPs, TRP #0 and TRP #1, corresponding to two different beam directions. A second CCE set includes two CCEs: CCE #0 and CCE #1. The CCEs in the second CCE set corresponding to each beam direction can be recorded as: TRP #0 CCE #0, TRP #0 CCE #1, TRP #1 CCE #0, TRP #1 CCE #1. The same CCE corresponds to different TRPs, which actually refers to that different beam directions are used to receive information sent by different TRPs on the same CCE. The network device may indicate an order of the contents of the DCI signaling sent by the four CCEs to the terminal device, so that the terminal device can correctly decode the DCI signaling. The position order of the four CCEs in the DCI signaling may be as follows:

Order 1: TRP #0 CCE #0, TRP #0 CCE #1, TRP #1 CCE #0, TRP #1 CCE #1.

Order 2: TRP #0 CCE #0, TRP #1 CCE #0, TRP #0 CCE #1, TRP #1 CCE #1.

There may also be other orders for the four CCEs, which are not limited in the embodiments of the disclosure.

2) The N beam directions correspond to different tune domain resources, and the N beam directions correspond to the N CCE sets one by one.

The terminal device can receive the DCI signaling through any of the following implementation methods.

Implementation method 1: When the N beam directions separately send the complete content of the DCI signaling through different time domain resources, the terminal device receives the same DCI signaling sent on the N CCE sets in the N beam directions separately based on ninth indication information. The ninth indication information is used to indicate a mapping relationship between time domains of the N CCE sets.

When the N beam directions separately use different time domain resources to send one complete DCI signaling, the terminal device may determine a time domain position relationship between the CCEs in the N CCE sets. The time domain position relationship between the CCEs in the N CCE sets can be indicated by the mapping relationship between the time domains of the N CCE sets.

Optionally, the mapping relationship between the time domains of the N CCE sets includes a mapping relationship between serial numbers of specific CCEs corresponding to the N CCE sets respectively. Or, the mapping relationship between the time domains of the N CCE sets includes a mapping relationship between serial numbers of PDCCH candidates corresponding to the N CCE sets respectively. Optionally, a specific CCE is a CCE at a minimum frequency in the CCE set.

Optionally, the mapping relationship between the time domains of the CCE sets is configured based on different aggregation levels. Or, the mapping relationship between the time domains of the CCE sets is the same for all aggregation levels.

In a case where the mapping relationship between the time domains of the N CCE sets includes the mapping relationship between the serial numbers of the specific CCEs corresponding to N CCE sots respectively, for example, there are 2 TRPs, namely, TRP #0 and TRP #1, corresponding to 2 different beam directions. TRP #0 corresponding to CCE set 1, TRP #1 corresponding to CCE set 2. CCE set 1 contains {CCE #i, CCE #i+1}, and CCE set 2 contains {CCE #j, CCE #j+1}. When the terminal device monitors on TRP #0 that CCE #i and CCE #i+1 send DCI signaling to it, it is known based on the mapping relationship that the DCI signaling sent by TRP #1 on CCE #j and CCE #j+1 is the same DCI signaling. The relationship between CCE #i and CCE #j can be as follows: j=i+offset. The offset can be 0, which means that the serial numbers are the same. The offset can also be greater than 0. When i+offset is greater than a maximum serial number of CCEs in TRP #1, a value of j is taken as (i+offset) mod (a maximum serial number of CCEs in TRP #1+1).

In a case where the mapping relationship between the time domains of the N CCE sets includes the mapping relationship between the serial numbers of the PDCCH candidates corresponding to the N CCE sets respectively, for example, the aggregation level is 4. In CORESET #0, PDCCH candidate #0 occupies CCE #0-3, PDCCH candidate #1 occupies CCE #8-11, and PDCCH candidate #2 occupies CCE #16-19. In CORESET 1, PDCCH candidate #0 occupies CCE #16-19, PDCCH candidate #1 occupies CCE #24-27, and PDCCH candidate #3 occupies CCE #0-3. The ninth indication information can indicate that the PDCCH candidate #i in the CORESET #0 corresponds to PDCCH candidate #i+offset in the CORESET #1, and the offset is an integer greater than or equal to 0. When the terminal device monitors that the PDCCH candidate #0 sends DCI signaling to it on CORESET #0, it is known based on the mapping relationship that the DCI signaling sent by the PDCCH candidate #i+offset on CORESET #1 is the same DCI signaling. Implementation method 2: When the N beam directions collectively send the complete content of the DCI signaling through different time domain resources, the terminal device receives the DCI signaling based on tenth indication information. The tenth indication information is used to indicate a mapping relationship between the time domains of N CCE sets.

When the N beam directions use different time domain resources to send a portion of the DCI signaling separately, so as to collectively send the complete content of the DCI signaling, the terminal device may determine a time domain position relationship between the CCEs in the N CCE sets. The time domain position relationship between the CCEs in the N CCE sets can be indicated by the mapping relationship between the time domains of the N CCE sets. At the same time, the terminal device can determine a position order of the contents sent by CCEs in different beam directions in the DCI signaling based on a default order. The default order can be: if a TCI number is ranked first, a CCE content corresponding to the TCI number is ranked first.

Optionally, the mapping relationship between the time domains of the N CCE sets includes the mapping relationship between the serial numbers of the specific CCE numbers corresponding to the N CCE sets respectively. Or, the mapping relationship between the time domains of the N CCE sets includes the mapping relationship between the serial numbers of the PDCCH candidates corresponding to the N CCE sets respectively. Optionally, a specific CCE is a specified CCE in a CCE set.

Optionally, the mapping relationship between the time domains of the CCE sets is configured based on different aggregation levels. Or, the mapping relationship between the time domains of the CCE sets is the same for all aggregation levels.

Implementation method 3: When the N beam directions collectively send the complete content of the DCI signaling using different time domain resources, the terminal device receives the DCI signaling based on eleventh indication information. The eleventh indication information is configured to indicate the mapping relationship between the time domains of the N CCE sets and a position order of the contents sent on the CCEs in the N CCE sets in the DCI signaling.

When the N beam directions use different time domain resources to send a portion of the DCI signaling separately, so as to collectively send the complete content of the DCI signaling, the terminal device may determine a time domain position relationship between CCEs in the N CCE sets. The time domain position relationship between the CCEs in the N CCE sets can be indicated by the mapping relationship between the time domains of the N CCE sets. At the same time, the terminal device can determine a position order of the contents sent by CCEs in different beam directions in the DCI signaling through the eleventh indication information.

Optionally, the mapping relationship between the time domains of the N CCE sets includes a mapping relationship between serial numbers of specific CCEs corresponding to the N CCE sets respectively. Or, the mapping relationship between the time domains of the N CCE sets includes a mapping relationship between serial numbers of PDCCH candidates corresponding to the N CCE sets respectively. Optionally, a specific CCE is a CCE at the lowest frequency in the CCE set.

Optionally, the mapping relationship between the time domains of the CCE sets is configured based on different aggregation levels. Or, the mapping relationship between the time domains of the CCE sets is the same for all aggregation levels.

Optionally, at least one of the ninth indication information, the tenth indication information, and the eleventh indication information in the above implementation methods is also configured to indicate an ID of a search space to which the N CCE sets belong, and/or an ID of a control resource set to which the N CCE sets belong.

The ID of the search space is configured to identify different search spaces, and the ID of the control resource set is configured to identify different control resource sets. In a case where CCE sets in different beam directions belong to different search spaces of the same control resource set or belong to different control resource sets, the terminal device can determine, according to an instruction, the different search spaces of the same control resource set to which the N CCE sets belong, and/or determine the different control resource sets to which the N CCE sets belong.

It should be noted that the above method embodiments can be implemented separately or in combination. The disclosure does not limit this.

In each of the above embodiments, the steps performed by the terminal device can be independently implemented as a receiving method at the terminal device side, and the steps performed by the network device can be independently implemented as a receiving method at the network device side.

FIG. 5 is a block diagram of a receiving apparatus according to an embodiment of the disclosure. The receiving apparatus may be implemented as a terminal device, or implemented as a part of a terminal device. The receiving apparatus includes a determining module 501 and a receiving module 502.

The determining module 501 is configured to determine a resource mapping relationship between control channel element (CCE) sets in N beam directions, N being a positive integer greater than 1.

The receiving module 502 is configured to receive downlink control information (DCI) signaling sent on the CCE sets in the N beam directions based on the resource mapping relationship.

In an alternative embodiment, the CCE sets in the N beam directions separately send a complete content of the DCI signaling; or, the CCE sets in the N beam directions collectively send the complete content of the DCI signaling.

In an alternative embodiment, the CCE sets include X CCEs, X being a positive integer. The X is equal to an aggregation level of the DCI signaling; or, the X is equal to the aggregation level of the DCI signaling divided by the N.

In an alternative embodiment, the resource mapping relationship includes a frequency domain mapping relationship.

In an alternative embodiment, the N beam directions correspond to a same frequency domain resource, and the N beam directions correspond to first CCE sets in the same frequency domain. The receiving module 502 is configured to receive same DCI signaling sent on the first CCE sets in the N beam directions separately in response to the N beam directions separately sending the complete content of the DCI signaling through the same frequency domain resource; or, the receiving module 502 is configured to receive the DCI signaling based on first indication information in response to the N beam directions collectively sending the complete content of the DCI signaling through the same frequency domain resource, the first indication information being configured to indicate a position order in the DCI signaling of a content sent on CCEs in a first CCE set corresponding to each beam direction.

In an alternative embodiment, the N beam directions correspond to different frequency domain resources, and the N beam directions correspond to N CCE sets one by one. The receiving module 502 is configured to receive, in the N beam directions separately based on second indication information, same DCI signaling sent on the N CCE sets in response to the N beam directions separately sending the complete content of the DCI signaling through different frequency domain resources, the second indication information being configured to indicate a mapping relationship between serial numbers of specific CCEs in the N CCE sets; or, the receiving module 502 is configured to receive, in the N beam directions separately based on third indication information, same DCI signaling sent on the N CCE sets in response to the N beam directions separately sending the complete content of the DCI signaling through different frequency domain resources, the third indication information being configured to indicate a mapping relationship between serial numbers of candidate physical downlink control channels (PDCCH candidates) corresponding to the N CCE sets respectively; or, the receiving module 502 is configured to receive the DCI signaling based on fourth indication information in response to the N beam directions collectively send the complete content of the DCI signaling through different frequency domain resources, the fourth indication information being configured to indicate a mapping relationship between serial numbers of specific CCEs in the N CCE sets; or, the receiving module 502 is configured to receive the DCI signaling based on fifth indication information in response to the N beam directions collectively send the complete content of the DCI signaling through different frequency domain resources, the fifth indication information being configured to indicate a mapping relationship between serial numbers of specific CCEs in the N CCE sets and a position order of contents sent on CCEs in the N CCE sets in the DCI signaling; or, the receiving module 502 is configured to receive the DCI signaling based on sixth indication information in response to the N beam directions collectively send the complete content of the DCI signaling through different frequency domain resources, the sixth indication information being configured to indicate a mapping relationship between serial numbers of PDCCH candidates corresponding to the N CCE sets respectively; or, the receiving module 502 is configured to receive the DCI signaling based on seventh indication information in response to the N beam directions collectively send the complete content of the DCI signaling through different frequency domain resources, the seventh indication information being configured to indicate a mapping relationship between serial numbers of PDCCH candidates corresponding to the N CCE sets respectively and a position order of contents sent on CCEs in the N CCE sets in the DCI signaling.

In an alternative embodiment, the mapping relationship between the serial numbers of the specific CCEs is configured based on different aggregation levels; or, the mapping relationship between the serial numbers of the specific CCEs is same for all the aggregation levels.

In an alternative embodiment, the specific CCEs are CCEs at a minimum frequency in the CCE sets.

In an alternative embodiment, at least one of the second indication information, the third indication information, the fourth indication information, the fifth indication information, the sixth indication information, and the seventh indication information is configured to indicate an ID of a search space to which the N CCE sets belong; and/or an ID of a control resource set to which the N CCE sets belong.

In an alternative embodiment; the mapping relationship between the serial numbers of the PDCCH candidates is configured based on different aggregation levels; or, the mapping relationship between the serial numbers of the PDCCH candidates is same for all the aggregation levels.

In an alternative embodiment, the resource mapping relationship includes a time domain mapping relationship.

In an alternative embodiment, the N beam directions correspond to a same time domain resource, and the N beam directions correspond to second CCE sets in the same time domain; the receiving module 502 is configured to receive same DCI signaling sent on the second CCE sets in N beam directions separately in response to the N beam directions separately sending the complete content of the DCI signaling through the same time domain resource; or, the receiving module 502 is configured to receive the DCI signaling based on eighth indication information in response to the N beam directions collectively sending the complete content of the DCI signaling through the same time domain resource, the eighth indication information being configured to indicate a position order in the DCI signaling of a content sent on CCEs in a second CCE set corresponding to each beam direction.

In an alternative embodiment, the N beam directions correspond to different time domain resources, and the N beam directions correspond to N CCE sets one by one. The receiving module 502 is configured to receive, in the N beam directions separately based on ninth indication information, same DCI signaling sent on the N CCE sets in response to the N beam directions separately sending the complete content of the DCI signaling through different time domain resources, the ninth indication information being configured to indicate a mapping relationship between time domains of the N CCE sets; or, the receiving module 502 is configured to receive the DCI signaling based on tenth indication information in response to the N beam directions collectively send the complete content of the DCI signaling through different time domain resources, the tenth indication information being configured to indicate a mapping relationship between time domains of the N CCE sets; or, the receiving module 502 is configured to receive the DCI signaling based on eleventh indication information in response to the N beam directions collectively send the complete content of the DCI signaling through different time domain resources, the eleventh indication information being configured to indicate a mapping relationship between time domains of the N CCE sets and a position order of contents sent on CCEs in the N CCE sets in the DCI signaling.

In an alternative embodiment, the mapping relationship between the time domains of the N CCE sets includes a mapping relationship between serial numbers of specific CCEs corresponding to the N CCE sets respectively; or, the mapping relationship between the time domains of the N CCE sets includes a mapping relationship between serial numbers of PDCCH candidates corresponding to the N CCE sets respectively.

In an alternative embodiment, the specific CCEs are CCEs at a minimum frequency in the CCE sets.

In an alternative embodiment, the mapping relationship between the time domains of the CCE sets is configured based on different aggregation levels; or, the mapping relationship between the time domains of the CCE sets is same for all the aggregation levels.

In an alternative embodiment, at least one of the ninth indication information, the tenth indication information, and the eleventh indication information is configured to indicate an ID of a search space to which the N CCE sets belong, and/or an ID of a control resource set to which the N CCE sets belong.

In an alternative embodiment, the determining module 501 is configured to determine the resource mapping relationship between the CCE sets in the N beam directions according to an instruction of a network device; or, the determining module 501 is configured to determine a predefined resource mapping relationship as the resource mapping relationship between the CCE sets in the N beam directions.

In an alternative embodiment, each CCE set includes a PDCCH candidate.

Figure 6:
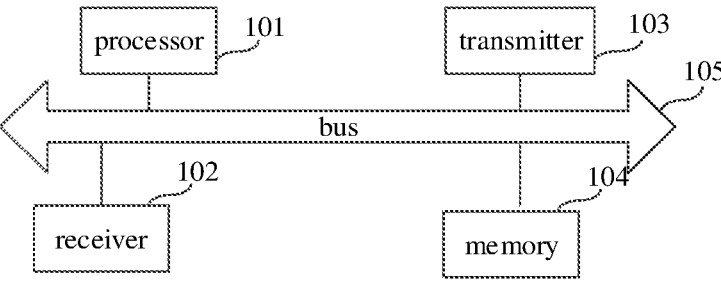
FIG. 6 is a block diagram of a terminal device according to an embodiment of the disclosure.

In an alternative embodiment, CCE sets in different beam directions belong to a same search space; or, the CCE sets in different beam directions belong to different search spaces in a same control resource set; or, the CCE sets in different beam directions belong to different control resource sets, FIG. 6 is a block diagram of a terminal device according to an embodiment of the disclosure. The terminal device includes a processor 101, a receiver 102, a transmitter 103, a memory 104, and a bus 105.

The processor 101 includes one or more processing cores. The processor 101 executes various functional applications and information processing by running software programs and modules.

The receiver 102 and the transmitter 103 can be implemented as a communication component, which can be a communication chip.

The memory 104 is connected to the processor 101 through the bus 105.

The memory 104 may be used to store at least one instruction, and the processor 101 may be used to execute the at least one instruction to implement the respective steps in the above method embodiment.

In addition, the memory 104 may be implemented by any type of temporary or non-temporary storage devices or their combination, such as a magnetic disk or an optical disk, an electrically erasable programmable read-only memory (EE-PROM), an erasable programmable read-only memory (EPROM), a static random access memory (SRAM), a read-only memory (ROM), a magnetic memory, a flash memory, a programmable read-only memory (PROM), etc.

In an exemplary embodiment, a computer-readable storage medium is also provided. The computer-readable storage medium stores at least one instruction, at least one program, a code set or an instruction set. The at least one instruction, the at least one program, the code set or the instruction set is loaded and executed by the processor to implement the receiving method provided by the above method embodiments and executed by the terminal device.

In an exemplary embodiment, a computer program product or a computer program is also provided. The computer program product or the computer program includes computer instructions stored in a computer readable storage medium. A processor of a computer device reads the computer instructions from the computer readable storage medium, the processor executes the computer instructions, and causes the computer device to perform the receiving method provided above embodiments.

Those skilled in the art can understand that all or part of the steps for implementing the above embodiments can be implemented by hardware, or can be implemented by instructing relevant hardware through programs. The programs can be stored in a computer readable storage medium, which can be a read-only memory, a disk or an optical disk.

The above are only example embodiments of the disclosure, and are not intended to limit the disclosure. Any modification, equivalent replacement, improvement, etc. made within the spirit and principles of the disclosure shall be included in the protection scope of the disclosure.

What is claimed is:

1. A receiving method, performed by a terminal device, comprising:

determining a resource mapping relationship between control channel element (CCE) sets in N beam directions, wherein N is a positive integer greater than 1, wherein the resource mapping relationship comprises a frequency domain mapping relationship, wherein the CCE sets in the N beam directions separately send a complete content of downlink control information (DCI) signaling; and receiving the DCI signaling sent on the CCE sets in the N beam directions based on the resource mapping relationship;

wherein in a case that the N beam directions correspond to a same frequency domain resource, and the N beam directions correspond to first CCE sets in the same frequency domain, receiving the DCI signaling sent on the CCE sets in the N beam directions based on the resource mapping relationship comprises:

receiving a same DCI signaling sent on the first CCE sets in the N beam directions separately in response to the N beam directions sending the complete content of the DCI signaling through the same frequency domain resource separately.

2. The receiving method of claim 1, wherein, the CCE sets comprise X CCEs, wherein X is a positive integer;

the X is equal to an aggregation level of the DCI signaling; or, the X is equal to the aggregation level of the DCI signaling divided by the N.

3. The receiving method of claim 1, wherein the N beam directions correspond to different frequency domain resources, and the N beam directions correspond to N CCE sets one by one, and receiving the DCI signaling sent on the CCE sets in the N beam directions based on the resource mapping relationship comprises:

receiving, in the N beam directions separately based on second indication information, same DCI signaling sent on the N CCE sets in response to the N beam directions separately sending the complete content of the DCI signaling through different frequency domain resources, the second indication information being configured to indicate a mapping relationship between serial numbers of candidate physical downlink control channels (PDCCH candidates) corresponding to the N CCE sets respectively.

4. The receiving method of claim 3, wherein the second indication information is configured to indicate an ID of a search space to which the N CCE sets belong, and/or an ID of a control resource set to which the N CCE sets belong.

5. The receiving method of claim 3, wherein, the mapping relationship between the serial numbers of the PDCCH candidates is configured based on different aggregation levels;

or, the mapping relationship between the serial numbers of the PDCCH candidates is same for all the aggregation levels.

6. The receiving method of claim 1, wherein the resource mapping relationship comprises a time domain mapping relationship.

7. The receiving method of claim 6, wherein the N beam directions correspond to a same time domain resource, and the N beam directions correspond to second CCE sets in the same time domain;

wherein receiving the DCI signaling sent on the CCE sets in the N beam directions based on the resource mapping relationship comprises:

receiving same DCI signaling sent on the second CCE sets in N beam directions separately in response to the N beam directions separately sending the complete content of the DCI signaling through the same time domain resource.

8. The receiving method of claim 7, wherein the N beam directions correspond to different time domain resources, and the N beam directions correspond to N CCE sets one by one;

wherein receiving the DCI signaling sent on the CCE sets in the N beam directions based on the resource mapping relationship comprises:

receiving, in the N beam directions separately based on third indication information, same DCI signaling sent on the N CCE sets in response to the N beam directions separately sending the complete content of the DCI signaling through different time domain resources, the third indication information being configured to indicate a mapping relationship between time domains of the N CCE sets.

9. The receiving method of claim 8, wherein, the mapping relationship between the time domains of the N CCE sets comprises a mapping relationship between serial numbers of specific CCEs corresponding to the N CCE sets respectively;

or, the mapping relationship between the time domains of the N CCE sets comprises a mapping relationship between serial numbers of PDCCH candidates corresponding to the N CCE sets respectively.

10. The receiving method of claim 8, wherein, the mapping relationship between the time domains of the CCE sets is configured based on different aggregation levels;

or, the mapping relationship between the time domains of the CCE sets is same for all the aggregation levels.

11. The receiving method of claim 8, wherein the third indication information is configured to indicate an ID of a search space to which the N CCE sets belong, and/or an ID of a control resource set to which the N CCE sets belong.

12. The receiving method of claim 1, wherein determining the resource mapping relationship between the CCE sets in the N beam directions comprises:

determining the resource mapping relationship between the CCE sets in the N beam directions according to an instruction of a network device;

or, determining a predefined resource mapping relationship as the resource mapping relationship between the CCE sets in the N beam directions.

13. The receiving method of claim 1, wherein, each CCE set comprises a PDCCH candidate.

14. The receiving method of claim 1, wherein CCE sets in different beam directions belong to one of:

a same search space;

different search spaces in a same control resource set; or different control resource sets.

15. A terminal device, comprising:

a processor;

a transceiver connected with the processor; and a memory for storing executable instructions of the processor;

wherein the processor is configured to:

determine a resource mapping relationship between control channel element (CCE) sets in N beam directions, wherein N is a positive integer greater than 1, wherein the resource mapping relationship comprises a frequency domain mapping relationship, wherein the CCE sets in the N beam directions separately send a complete content of downlink control information (DCI) signaling; and receive the DCI signaling sent on the CCE sets in the N beam directions based on the resource mapping relationship;

wherein in a case that the N beam directions correspond to a same frequency domain resource, and the N beam directions correspond to first CCE sets in the same frequency domain, the processor is further configured to: receive a same DCI signaling sent on the first CCE sets in the N beam directions separately in response to the N beam directions sending the complete content of the DCI signaling through the same frequency domain resource separately.

\* \* \* \* \*